3,770,627
CONTAINING AND REMOVING OIL SPILLS
ON WATER
Henry E. Alquist and Robert T. Werkman, Bartlesville,
Okla., assignors to Phillips Petroleum Company
No Drawing. Filed Dec. 7, 1971, Ser. No. 205,740
Int. Cl. E02b 15/04
U.S. Cl. 210—40                                 8 Claims

ABSTRACT OF THE DISCLOSURE

A method is provided for containing oil on a water surface and removing the oil from the water surface by fusing a finely particulate polyolefin floating on the surface with the oil to incorporate the oil into a crust-like fused mass which will act to form a boundary against extension of the oil mass and which can be easily skimmed from the water surface.

BACKGROUND OF THE INVENTION

This invention relates to containing a mass of oil which is floating on the surface of a body of water. In one of its aspects, it relates to the removal of oil from the surface of a body of water. In another of its aspects, this invention relates to the incorporation of oil into a fused mass with a polyolefin substance.

In one concept of the invention it relates to providing a barrier around an oil mass floating on water, by fusing an olefinic polymer floating with the oil at the periphery of the floating mass.

In another concept of the invention it relates to facilitating the removal of an oil mass from an aqueous surface by fusing a polyolefinic substance on the surface of the mass incorporating the polymer and the oil in a fused mass easily skimmed from the water surface.

Ecological damage from surface contamination by oil presents a problem in most of the commercial waterways of the world. Open coastal waters, estuaries, and lakes are areas where the spillage of oil is of most serious concern. Industrial slush ponds also present a continuing problem for removal of oily surface waste. Of particular interest is the contamination caused by spills of crude oil.

The problems associated with oil spills on water surfaces have become well known. Up to this time no really effective means has been found for containing a mass of oil floating on a water surface. It is important both to be able to confine the spread of an oil mass on a liquid surface and to be able to remove the mass of material from the water surface.

It is therefore an object of this invention to provide a method for containing oil spills on water.

It is another object of this invention to provide a method for removing oil from the surface of water.

Other aspects, objects and advantages of this invention will be apparent from the disclosure and the claims.

Broadly, the invention provides a method for producing a coherent mass containing oil in such a form that it can be removed from the surface of water. This method consists of applying to the surface of the oil (1) a particulate thermoplastic, organic polymer of particle size less than 10 mesh and of density sufficient to float on the oil surface and (2) an inflammable substance, igniting the inflammable substance to fuse the polymer, thereby forming a coherent mass of fused polymer containing the oil.

In one embodiment a coherent mass containing oil is produced which permits the removal of the mass of the oil from the surface of the water.

In another embodiment a coherent mass containing floating oil is produced on the periphery of a floating oil mass to retain the oil and prevent its spreading over the surface of the water. For large spills a containing ring of fused polymer 6 to 10 feet in radial thickness at the perimeter of the spill can be developed. Repetition of the fusing of additional polymer can be used to build a ring 6 inches to a foot or more in vertical thickness which will contain the crude oil in the center until it can be pumped out.

The technique disclosed above is effective for use with crude oil or sludge oils, such as typical Middle Eastern crudes, containing relatively little light hydrocarbon ends. The ignition of the flammable substance will ignite some of these light ends, but with the water below the crude oil acting as a heat sink the crude oil will not continue to support combustion.

In the practice of this invention any suitable thermoplastic organic polymer or mixtures thereof can be used. For example polymers of mono alpha olefins containing from 2 to 10 or more carbon atoms can be used such as homopolymers or copolymers of ethylene, propylene, 1-butene, 1-hexene, 1-octene and so on. Interpolymers of the mono alpha olefins and other polymerizable materials can also be used among which are ethylene-vinyl acetate, ethylene-methylmethacrylate, ethylene acrylic acid copolymer, ethylene - methylmethacrylate, ethylene - vinylidene chloride, ethylene-vinyl fluoride, and so on. Homopolymers of other polymerizable materials can also be used, including polyvinyl chloride, polyvinylidene chloride, copolymers of vinyl fluoride with vinyl acetate of vinylidene acetate.

The particulate thermoplastic organic polymer used can have various shapes but the particulate size found appropriate for best producing the coherent mass of crude oil and fused polymer should be fine enough to pass through a 10 mesh screen. Generally the smaller the particles the more appropriate they are for use in this invention so that particles retained on a 35 mesh screen will give good performance. Best performance tested employs material 75 percent of which will pass through a 30 mesh screen.

Among the suitable flammable materials which can be used are hydrocarbons in the kerosene boiling range, i.e., 250 to 500° F. Such hydrocarbons include paraffins, olefins and aromatics. Compositions such as those used in lighter fluid are also appropriate. Sufficient amounts of the inflammable substance must be present to provide sufficient heat upon ignition to fuse the polymer. In general an amount of flammable material ranging from 0.05 to 0.5 percent by weight of the polymer is sufficient to fuse the polymer, but amounts outside this range can also be used. Addition of the flammable material to the surface can be done separately or the substances can be premixed with the polymer.

The thermoplastic particulate polymers and the inflammable material can be added to the crude oil on the water by any suitable means. The polymer can be manually broadcast or mechanically sprayed on the surface. The inflammable material is generally best handled by mechanical spraying either by itself or in combination with the polymer.

Example I

A small amount of very heavy Morichal crude oil from Venezuela was poured on the surface of a pan of water. Finely divided particulate polymer, such as one of those listed in Example II, was sprinkled over the crude oil by hand. Kerosene was sprayed over the polymer which was floating on the crude oil with a small hand aerosol sprayer. During the few seconds which elapsed between sprinkling the polymer on the crude oil and spraying the kerosene, the surface of the polymer particles became coated with crude oil by wetting action. This was evidenced by a change in color of the plastic particles from light to dark. The kerosene was then ignited. When the flame died out, the oil and polymer were fused together in a crust which was easily skimmed from the surface of the water, leaving a clean surface.

Example II

Tests were conducted as in Example I using resin of four different types having different melt points and being composed of particles of different sizes. The effectiveness of these different types of resin in solidifying a Venezuelan crude oil is reported below in Table I.

TABLE I

| Resin | Melt point, °C. | Standard screen size | Effectiveness in solidifying crude oil |
|---|---|---|---|
| Low density polyethylene | 110 | 10 mesh | Poor. |
| Medium density polyethylene | 125 | 75% pass 10 mesh, all retained on 35 mesh | Fair. |
| Marlex® 6050 | 135 | Not measured but smaller particles than medium density PE above. | Better. |
| Polypropylene | 175 | 75% pass 30 mesh, 50% pass 30 mesh, 30% pass 100 mesh, 15% pass 200 mesh. | Best. |

The table above illustrates that the particle size of the polymer is more important to the effective carrying out of the invention than is the melting point of the polymer.

Reasonable variation and modification are permissible within the scope of the disclosed invention the essence of which is that thermoplastic particles of small size can be fused while floating with crude oil on the surface of water to incorporate the crude oil into the fused polymer mass yielding a solid mass that can be readily skimmed from the water.

We claim:
1. A method for containing an oil mass floating on water which method comprises:
   (a) spreading thermoplastic polymer particles of maximum size of 35 mesh retention in a ring on the surface of oil floating on water thereby encircling the mass of oil;
   (b) spreading over the particles a flammable substance in sufficient amount to provide on ignition the amount of heat necessary to fuse the polymer particles; and
   (c) igniting the flammable substance to provide a ring of oil fused with polymer encircling the mass of oil whereby spreading of the mass is prevented.
2. The method of claim 1 wherein said inflammable substance is present in an amount of 0.05 to 0.5 percent by weight of said polymer.
3. The method of claim 1 wherein the polymer is selected from homo- and copolymers of mono-alpha olefins, and copolymers of mono-alpha olefins.
4. The method of claim 1 wherein the inflammable substance is seelcted from hydrocarbons in the kerosene boiling range.
5. A method for removing oil from the surface of water comprising:
   (a) spreading particles of a thermoplastic polymer of maximum size of 35 mesh retention on the surface of the oil floating on the water;
   (b) spreading over the particles a flammable substance in sufficient amount to provide on ignition the amount of heat necessary to fuse the polymer particles;
   (c) igniting the flammable substance; and
   (d) removing the crust oil fused with polymer formed during the ignition period.
6. The method of claim 5 wherein the inflammable substance is present in an amount of from 0.05 to 0.5 percent by weight of said polymer.
7. The method of claim 5 wherein said polymer is selected from homo- and copolymers of mono-alpha olefins and copolymers of mono-alpha olefins with at least one different polymerizable substance.
8. The method of claim 5 wherein the inflammable substance is selected from hydrocarbons in the kerosene boiling range.

References Cited

UNITED STATES PATENTS 3,536,616  10/1970  Kondoh et al. _____ 210—40

FOREIGN PATENTS 979,978  1/1965  Great Britain _____ 210—DIG. 21

OTHER REFERENCES

A. D. Little: Combating Pollution Created by Oil Spills, June 1969, pp. 80–81.

SAMIH N. ZAHARNA, Primary Examiner

I. CINTINS, Assistant Examiner

U.S. Cl. X.R.

61—1 F